(12) United States Patent
Jones et al.

(10) Patent No.: US 10,448,613 B2
(45) Date of Patent: Oct. 22, 2019

(54) SECURING ASSEMBLY FOR SUPPORTING AND SELECTIVELY CONCEALING AN ANIMAL CRATE

(71) Applicants: Courtney Nations Jones, Atlanta, GA (US); Michael Duffy Jones, Atlanta, GA (US)

(72) Inventors: Courtney Nations Jones, Atlanta, GA (US); Michael Duffy Jones, Atlanta, GA (US)

(*) Notice: Subject to any disclaimer, the term of this patent is extended or adjusted under 35 U.S.C. 154(b) by 0 days.

(21) Appl. No.: 15/879,370

(22) Filed: Jan. 24, 2018

(65) Prior Publication Data

US 2018/0146638 A1 May 31, 2018

Related U.S. Application Data

(63) Continuation-in-part of application No. 14/666,502, filed on Mar. 24, 2015, now Pat. No. 9,901,069.

(60) Provisional application No. 61/969,356, filed on Mar. 24, 2014.

(51) Int. Cl.
*A01K 1/03* (2006.01)
*A01K 1/00* (2006.01)

(52) U.S. Cl.
CPC .............. *A01K 1/033* (2013.01); *A01K 1/007* (2013.01)

(58) Field of Classification Search
CPC ........ A01K 1/033; A01K 1/034; A01K 1/035; A01K 1/007; A01K 1/0353
USPC ....................................... 312/334.44, 334.45
See application file for complete search history.

(56) References Cited

U.S. PATENT DOCUMENTS

| | | | | |
|---|---|---|---|---|
| 2004/0227444 | A1* | 11/2004 | Booker | F16F 9/0218 312/334.45 |
| 2009/0031964 | A1* | 2/2009 | Proxmire | A01K 1/033 119/484 |

* cited by examiner

*Primary Examiner* — Trinh T Nguyen
(74) *Attorney, Agent, or Firm* — Rachel H. Huffstetler; FisherBroyles, LLP

(57) ABSTRACT

A securing assembly for supporting an animal crate within an architectural structure and the animal crate may be selectively concealed. A platform supports the bottom surface of the crate and may be extended or retracted within the architectural structure. The securing assembly includes a track which is selectively secured to the architectural structure and the platform includes a mating flange for cooperating with the track. The platform includes a mount for the animal crate which permits the crate to be manipulated to extend and retract the platform.

12 Claims, 15 Drawing Sheets

SECURING ASSEMBLY FOR SUPPORTING AND SELECTIVELY CONCEALING AN ANIMAL CRATE

CROSS-REFERENCE TO RELATED APPLICATIONS

This application is a continuation-in-part and claims priority to and the benefit of U.S. Ser. No. 14/666,502 filed Mar. 24, 2015, which claims priority to and the benefit of U.S. Provisional Patent Application No. 61/969,356, filed Mar. 24, 2014, which are incorporated herein in entirety.

BACKGROUND OF THE INVENTION

Crates are used for domesticated animals, such as dogs, for a variety of reasons. For example, dog crates are used both for training and safety devices and can benefit the dog and the dog owner alike. Crates are often used for dogs when they are left alone, when they are sleeping and, most commonly, for crate training. In fact, the primary purpose of crate training is for housetraining. Crate training uses a dog's natural instinct as a den animal. The crate becomes the dog's den and provides an ideal location to rest or take refuge from household activity. Dogs do not like to soil their dens, or crates and, as a result, a dog learns to control its bodily functions. The crate also limits access to the rest of the house, particularly during the puppy stage. A crate is most effective when it is placed in an area of a house where the family spends most of their time, such as the family room. However, the appearance of a crate in a family room or other room may be less than desirable from an aesthetic standpoint. Moreover, it may be cumbersome to move the crate out of a room when it is not needed and when it is desirable for the crate not to be seen. These shortcomings of prior art crates are obviated by the present invention which provides a securing assembly for supporting a dog crate which is selectively concealed within an architectural structure, such as a cabinet or furniture article, so as not to negatively impact the aesthetics of the room. The securing assembly may be utilized in a variety of architectural structures and may be permanently or removably secured thereto.

SUMMARY OF THE INVENTION

According to one aspect of the present invention, a crate assembly is provided including an animal crate and a crate securing assembly. The animal crate includes a door assembly which is vertically raised and lowered within vertical tracks. The securing assembly includes a platform which is slideably moveable from an extended and retracted position. The platform includes securing members for cooperating with a support preferably in the form of a track which may be mounted to an architectural structure.

According to the invention, the door assembly, permitting ingress and egress of the animal, varies in configuration and in its connection to the securing members of the door assembly. The door assembly includes vertical tracks which extend along the crate front, adjacent side members thereof. The door of the door assembly includes an upper and lower portion which are hingedly connected to one another wherein the door may be raised and the upper portion may lay substantially flat upon the crate top when the platform is in the extended position. According to one aspect, the crate door is pliable and the connection of the door to the tracks includes a track which extends vertically along the front face of the crate and horizontally along the top face of the crate. Side members, preferably in the form of a bush roller chain, is moveably along the length of the track wherein the door is raised and remains flush with the crate at various heights. As such, the platform need to be extended for the door to be raised. According to various aspects of the present invention, the crate may be fixedly secured to the platform or removably secured thereto.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention.

DETAILED DESCRIPTION OF THE INVENTION

Figure 1:
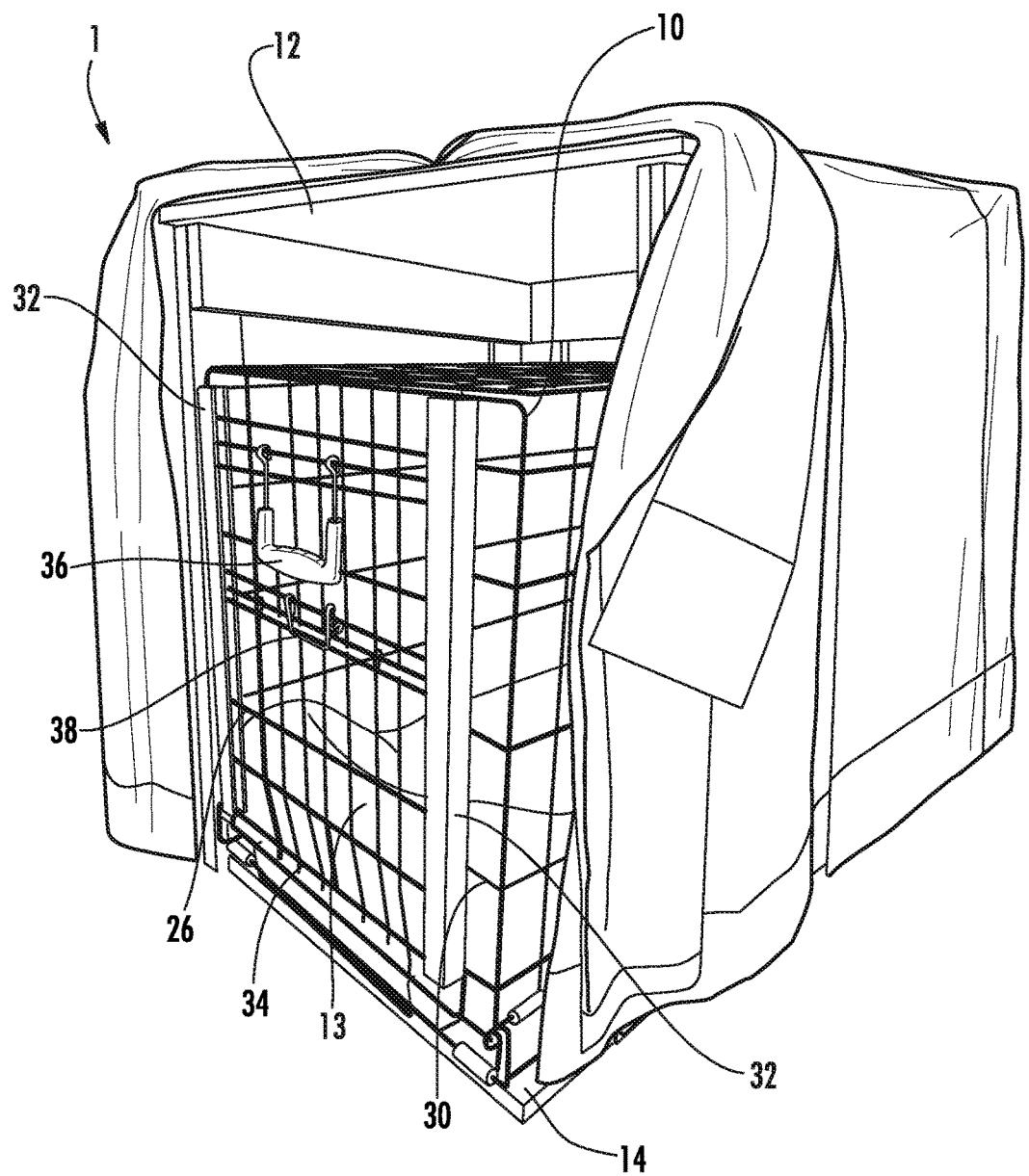
FIG. 1 is a perspective view of the selectively concealed animal crate positioned within an article of furniture.

The present invention will now be described in detail hereinafter by reference to the accompanying drawings. The invention is not intended to be limited to the embodiments described; rather, this detailed description is provided to enable any person skilled in the art to make and practice.

The present invention is directed to a securing assembly for supporting an animal crate assembly 1 including an animal crate 10 to an architectural structure 12. The animal crate 10 is particularly beneficial to house a domestic animal (e.g., a dog or cat), which may be selectively concealed or obscured from view by an article of furniture 12 or other architectural structure. As used herein, the term "architectural structure" may be any structure, such as an article of furniture or a more permanent structure, such as a cabinet. The animal crate may be concealed within its environment by the article of furniture or other structure within which it is housed. As shown in the various Figures, the present invention is used in combination with a table 12. The size, and hence use/type of furniture within an environment, may vary depending upon the size of the animal to use the crate. For example, a crate for a very large dog will be used in connection with a large article of furniture (e.g., a sofa or dining table) or other structure as compared with a crate for a smaller animal that may be used in connection with an end table. Alternatively, it is envisioned that aspects of the present invention may by employed with more permanent structures, such as cabinetry or other housing structures wherein the securing assembly and the crate are provided without the architectural structure and/or cover disclosed herein. For the purposes of the discussion which follows, the dog crate according to the present invention is used in combination with a table (an end table).

The present invention includes a novel animal crate 10 and novel securing assembly for positioning and securing the animal crate 10 within the article of furniture 12. It includes means for selectively moving the crate between a first retracted position wherein the crate is concealed by the furniture and a second extended position wherein the crate is not obscured from view by the furniture. The present invention also includes a novel crate door assembly 26 and a novel securing assembly for mounting the door assembly 26 to the crate 10.

As shown in the various Figures, the animal crate 10 is a four-sided crate comprising horizontal and vertical bars defining the top, bottom and three side walls. The crate 10 according to the present invention also includes a novel door assembly 26 described in more detail below according to various aspects. As is known in the art, the crate 10 may include a removable tray which serves as the base of the crate and upon which the animal is situated. As shown, a cushion 13 may be provided upon the removable tray. The animal crate assembly 1 according to the present invention includes a platform 14 for supporting the animal crate 10. As disclosed herein, the platform 14 and crate 10 may be secured to one another or, according to an alternative aspect, the crate 10 may be readily removed from the platform 14 for a myriad of reasons, such as to utilize the crate 10 independent of the table or removed for cleaning.

Figure 2:
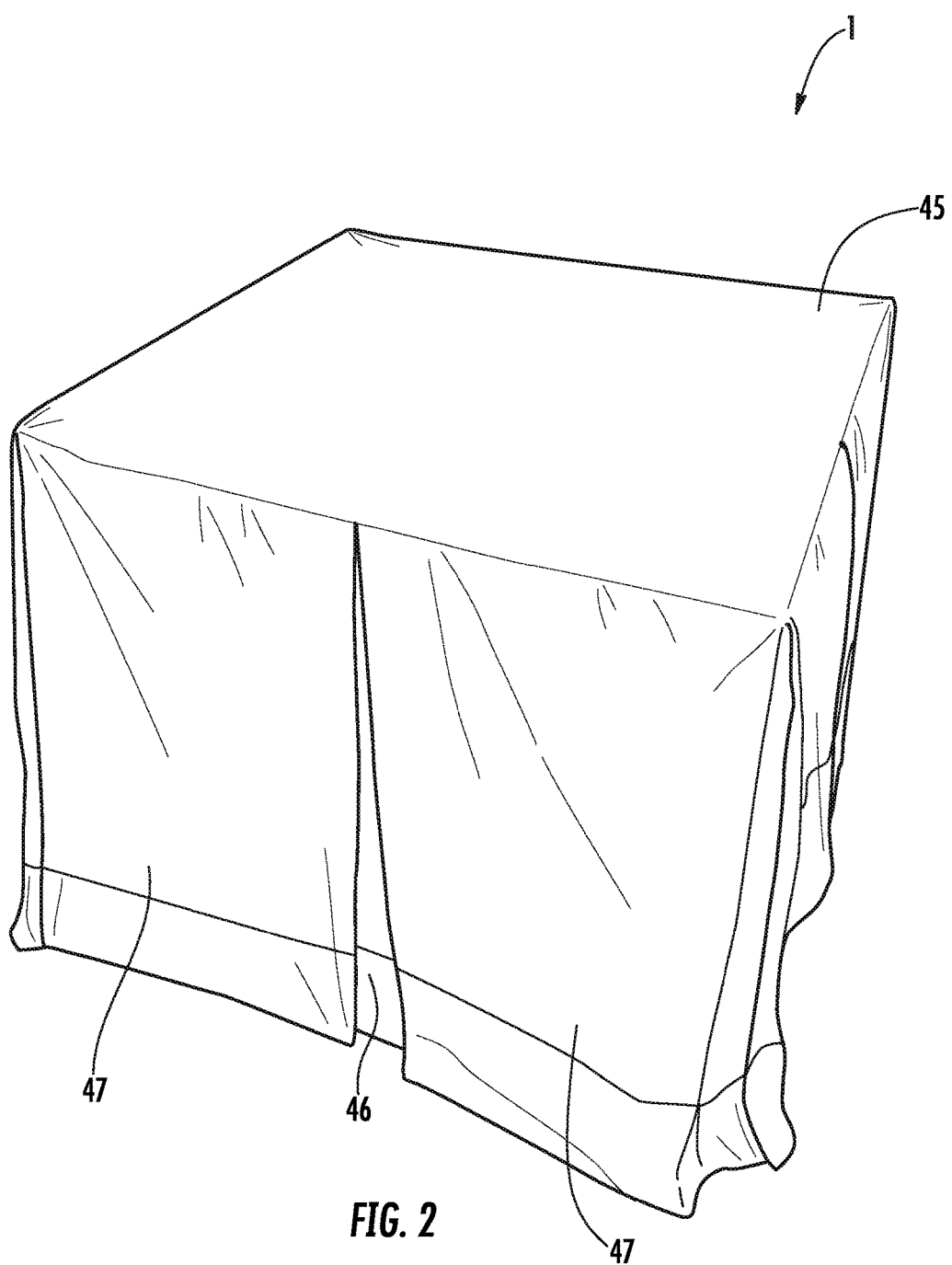
FIG. 2 is a perspective view of the article of furniture with the animal crate concealed by the article of furniture.

FIG. 2 illustrates the crate 10 in a fully concealed position beneath the table 12. As shown, the table includes a flexible, e.g. fabric, skirt 45 which covers the table frame 12 and substantially conceals the animal crate assembly 1 including the animal crate 10. Preferably, the skirt 45 includes an unsecured medial panel 46 and side panels. This enables the platform 14 to be moveable between the retracted and concealed position (FIG. 2) extended position (FIG. 3) and positions between the two. In the retracted position, the crate assembly 1 is substantially concealed from view. The crate may nonetheless be accessed by the animal in the retracted positioned due to the configuration of the access panel defined by the medial 46 and side panels 47 of the skirt 45. An animal may walk through the openings defined by the unsecured medial panel and side panels of the skirt when the crate door is raised, even when the crate is fully concealed beneath the furniture. The fully concealed position may be particularly desirable when the animal is not in the crate 10 or when the animal is in the crate and it is desirous to provide an enclosed housing, such as for sleeping. It may be desirable to extend the crate 10 from beneath the table 12 to facilitate greater circulation for the animal while in the crate 10, as well as easier access and ability to clean the skirt 45 and the crate 10. In either position, the crate door may be opened by lifting the handle 36 which lifts the door until the upper panel portion rests flush with the top of the crate 10 as explained more fully below. This configuration enables less clearance with the furniture 12 facilitating greater obscurity. Furthermore, it provides desirable clearances within the environment (that is, no swinging doors extending into a room) in either position.

Figure 3:
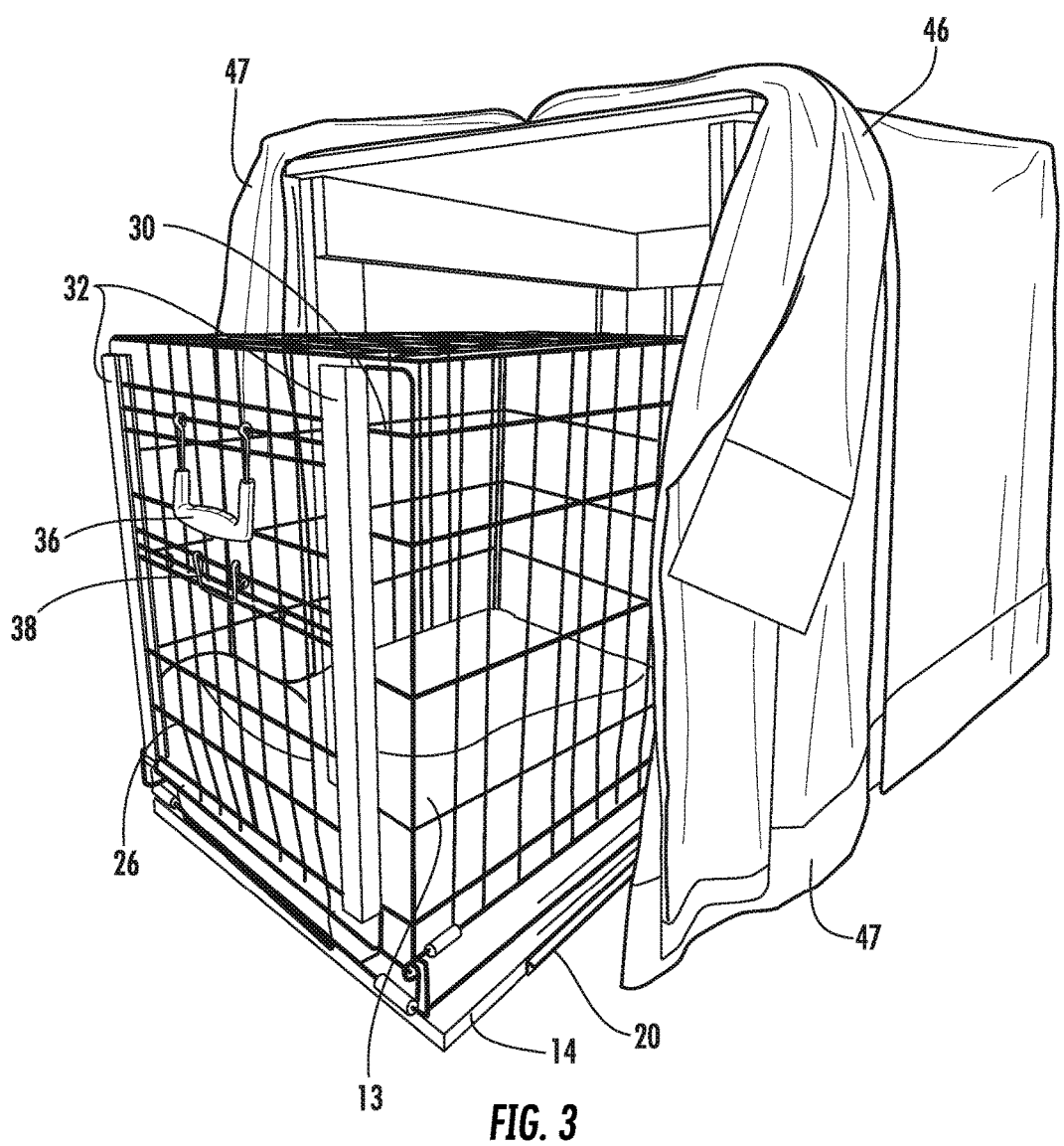
FIG. 3 is a perspective view of the animal crate in a fully extended position and not concealed by the article of furniture.

FIG. 1 depicts the crate assembly 1 wherein the crate 10 and platform 14 are positioned in a retracted position with the skirt 45 lifted so as to expose the crate 10. This position may be particularly desirable when the animal is housed within the crate 10 while providing ventilation and sight lines for the animal. FIG. 3 depicts the crate assembly 1 wherein the crate 10 and the platform 14 are substantially extended from the table 12 in an extended position. This position is particularly advantageous when the animal is housed in the crate to provide full ventilation from all sides, to open the crate door 25, to remove the crate 10, or far a variety of other reasons.

Figure 8:
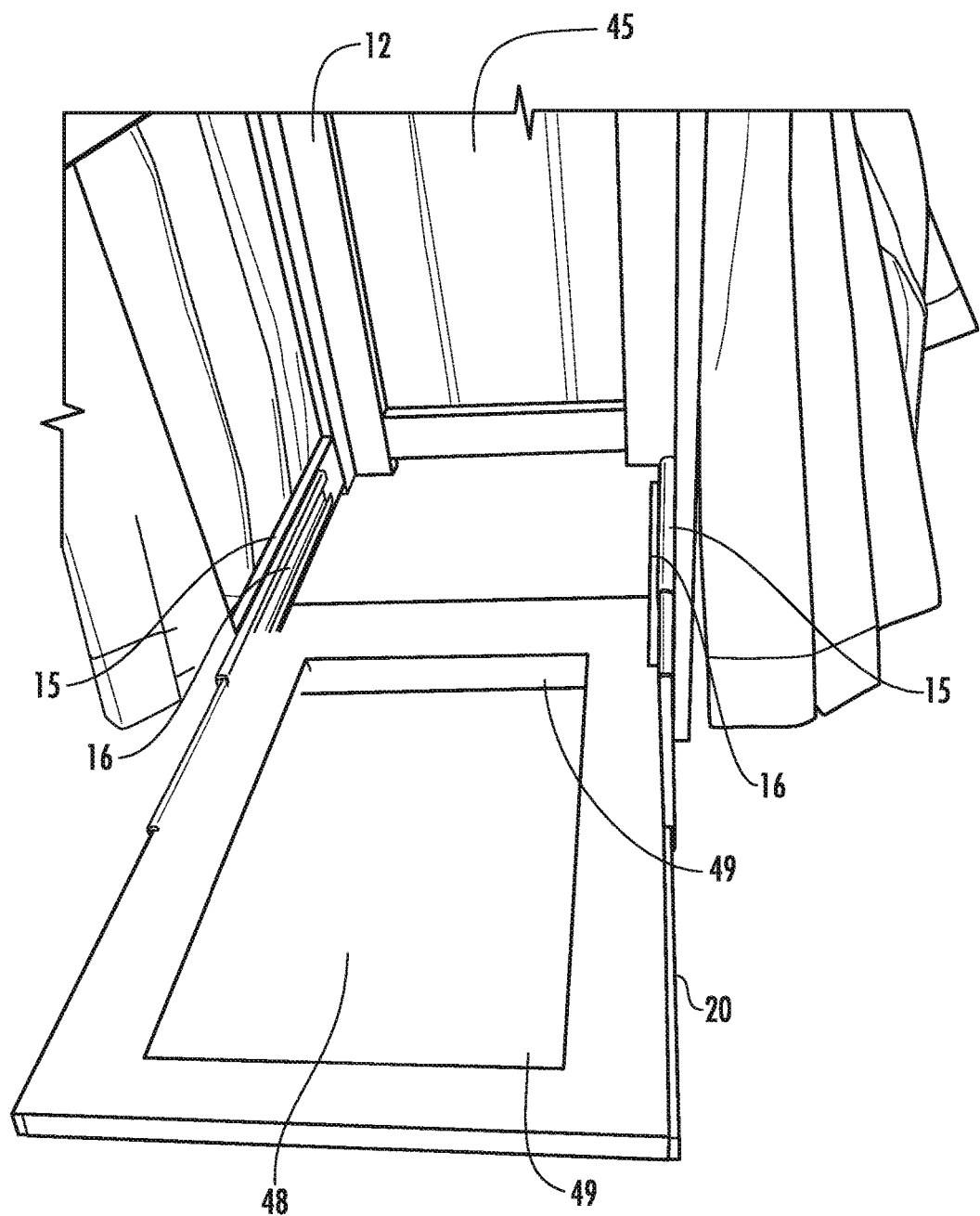
FIG. 8 is a perspective view of the platform according to another aspect for securing the animal crate within the article of furniture.
Figure 9:
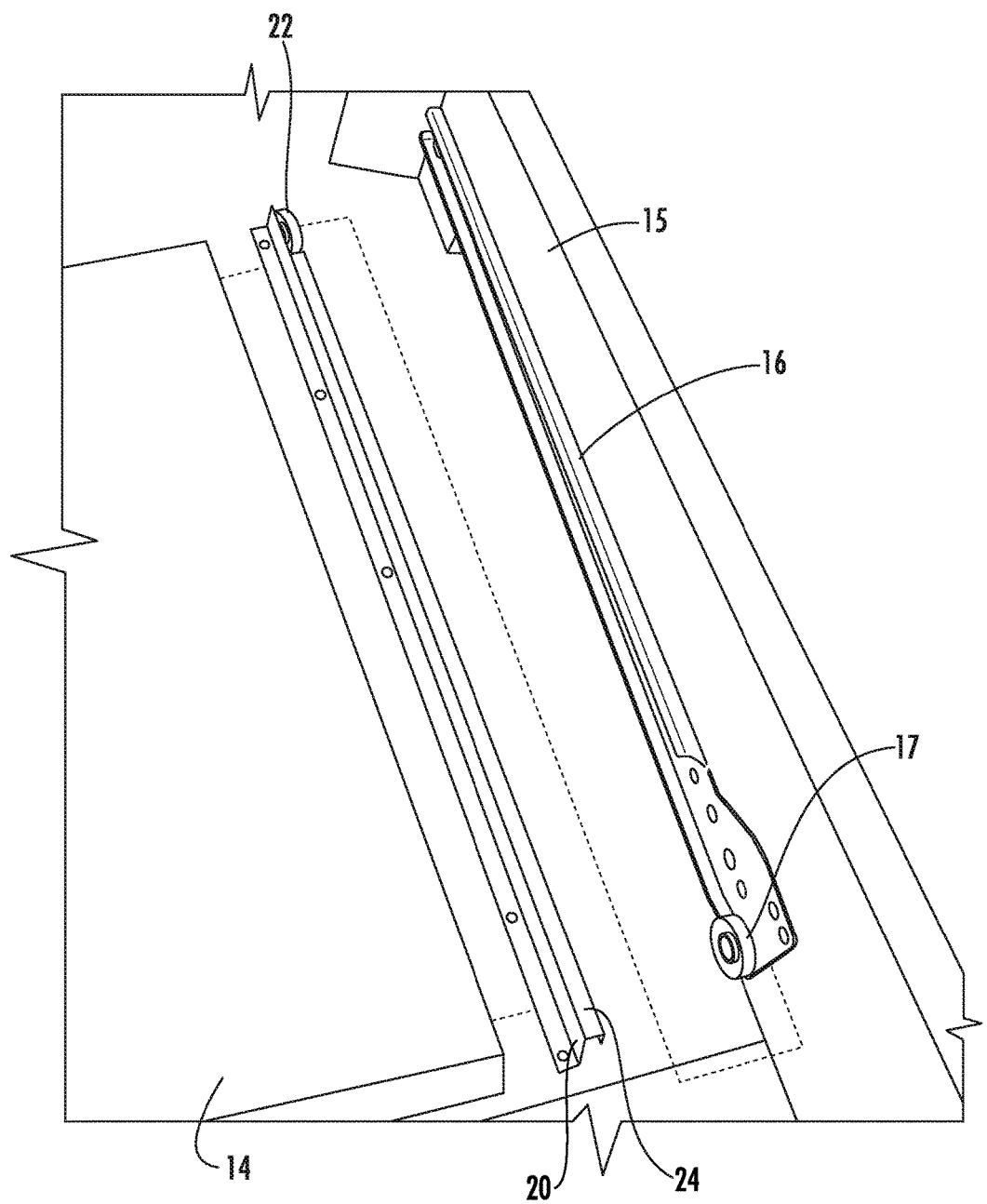
FIG. 9 is a partially exploded view of the track and platform connection.

A platform 14 is provided to support the animal crate 10 and to cooperate with the securing assembly to facilitate movement of the platform 14 between the fully extended and fully retracted positions. As shown in the various Figures, the securing assembly is mounted to a table 12, preferably, and includes an intermediate frame member 15 for cooperating with the architectural structure. Of course, a table 12 is shown as an exemplary use and the securing assembly may support the crate 10 within any architectural structure, such as a cabinet or other item of furniture or structure. As shown in FIGS. 8 and 9, frame member 15 extends longitudinally a length sufficient for extending along side surfaces of the table, e.g., between opposing front and rear legs. Of course, if a different architectural structure were employed, the frame member 15 may be unnecessary. The securing assembly includes a first slideable mounting member, in the form of a track 16. In use, the first slideable mounting member may be operatively connected to a respective surface of the structure within which the crate assembly is housed to extend longitudinally along an inwardly facing side edge of the frame member 15 or directly to the structure. According to the illustrated assembly, a pair of frame members 15 and tracks 16 are provided on opposing sides of the table and extend between bottom portions of opposing table legs. The track 16 includes a pair of parallel lips 18 which define a channel 19.

As shown in FIG. 9, a wheel 17 is mounted to the fore end of the track 16. The track 16 is configured to cooperate with a longitudinally extending mating member 20 which extends outwardly from side edges of the platform 14. As shown, the mating member 20 includes at least one wheel 22 positioned adjacent the aft end of the platform side edge and preferably also a flange 24. The flange 24 is configured to cooperate with the frame track 16 and which extends substantially along the length of the platform 14. In operation, the platform 14 is inserted into the frame 15 by sliding the platform wheel 22 over the frame wheel 17 at a slight angle (relative to the horizontal). Once the platform wheel 22 clears the frame wheel 17, the platform 14, in a substantially horizontal position, is further slid in the aft direction. This configuration provides a stop for unintentional removal of the platform 14 from the track 16 when sliding the platform 14 in the fore direction in that the platform 14 must be pulled upwardly to disengage the cooperating wheels.

A unitary flange 24 along side edges of the platform 14 is shown, but it within the scope of the present invention to have plural flanges or a single or multiple pins positioned along the length of the platform side edge and which are configured to cooperate with the track. Also, it is within the scope of the present invention to provide plural wheels along the length of the platform 14 side edges wherein no flange would be included. More than one wheel may also be provided along the track 16.

The flange 24 and track 16 may be formed of rigid materials known in the art such as plastic, rubber, metal or composite materials. As shown, the flange 24 and track 16 are formed of a plastic. Accordingly, sufficient tolerances are provided to enable the flange 24 or other mating member to slide within the track 16. Preferably, one slideable mounting member 16 is mounted on each of the two opposing sides of the frame 15 and a mating member or furniture 12. It is within the scope of the present invention, however, for these to be reversed wherein the platform supports the track and the mating member extends inwardly from the frame or furniture. It is also within the scope of the present invention to provide a track which is secured directly to the furniture (or other structure) without the use of an intermediate frame. It is also within the scope of the present invention to provide a platform that extends from any side of the table or in multiple directions.

Figure 7:
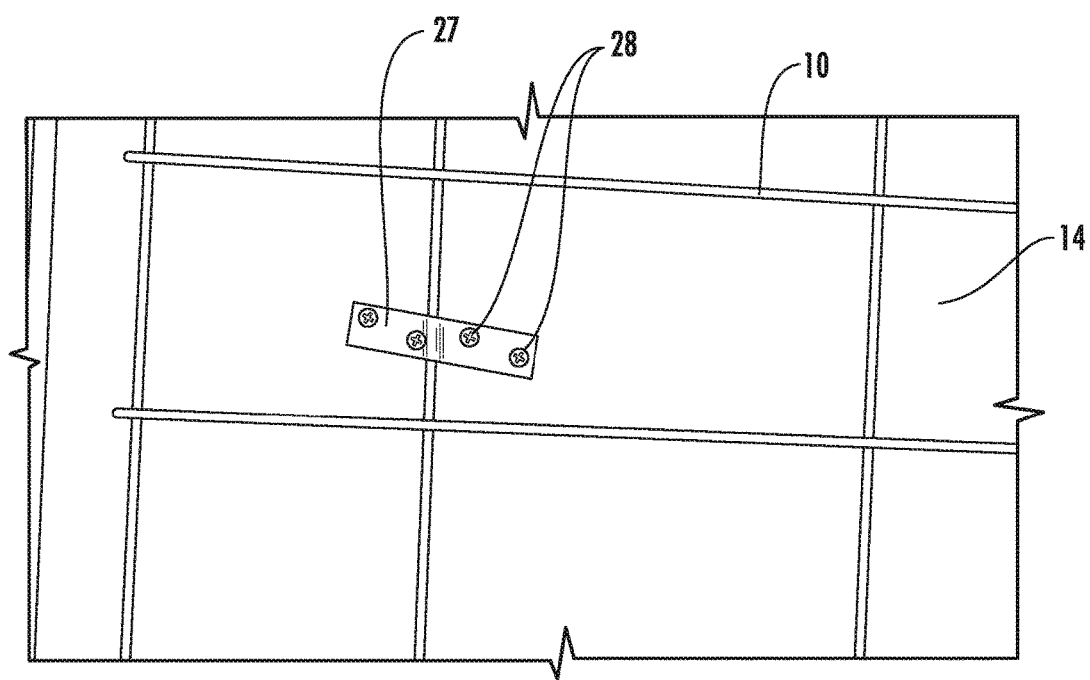
FIG. 7 is an enlarged view of the securing member for securing the animal crate to the supporting platform.

As shown in FIGS. 7 and 9, the platform 14 is substantially flat and is generally planar. As such, the crate 10 is positioned upon the upper surface of the platform. The crate is secured to the platform 14 by suitable means, such as a plate 27 and one or more screw fasteners 28.

The frame member 15 and the platform 14 may be formed from any suitable material such as medium-density fiberboard or a plastic and the crate may be formed of any suitable material such as coated or uncoated metal or plastic. As shown, the table 12 includes a top and four legs attached on the inside, with a three-sided interior upper brace to ensure stability. At least the front is open to allow the crate and the platform to be extended.

As shown in FIG. 8, the platform 14 is configured for removable receipt of the crate 10. The platform 14 defines a crate mount which, according to one aspect, is an aperture 48 configured for receipt of the animal crate 10. The aperture 48 includes at least a pair of flanges 49 on opposing side edges of the aperture 48 for supporting the crate 10. As shown, the at least pair of flanges 49 includes opposing fore and aft flanges 49. Inner surfaces of the apertures 48 adjacent the flanges 49 define a cooperating member for cooperating with surfaces of the crate 10 when the crate 10 is manipulated to slide the platform 14 inward or outward. As shown, flanges 49 are on fore and aft edges of the aperture 48, but they may also be on opposing side edges or on all edges of aperture 48. Accordingly, the platform 14 may be fully or partially extended and the crate may be readily lifted off to be used independent of the crate assembly 1. This novel configuration, however, enables the crate 10 to be pulled forward to extend the platform 14 while the crate engages the cooperating member defined by the aperture 48 so as not to slide off the platform 14 during sliding movement thereof.

Figure 14A:
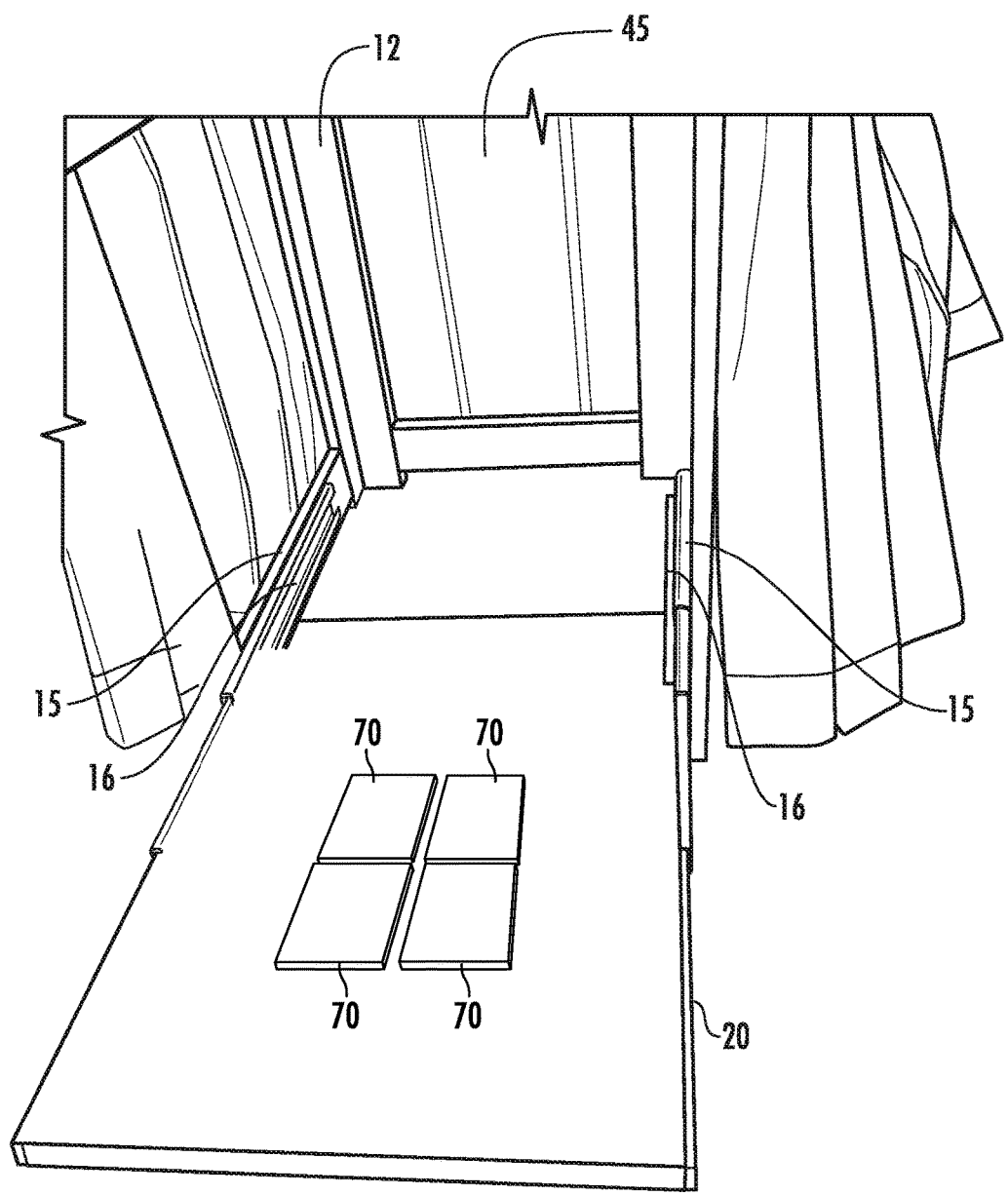
FIG. 14A is a perspective view of the platform for supporting the animal crate in a fully extended position.
Figure 14B:
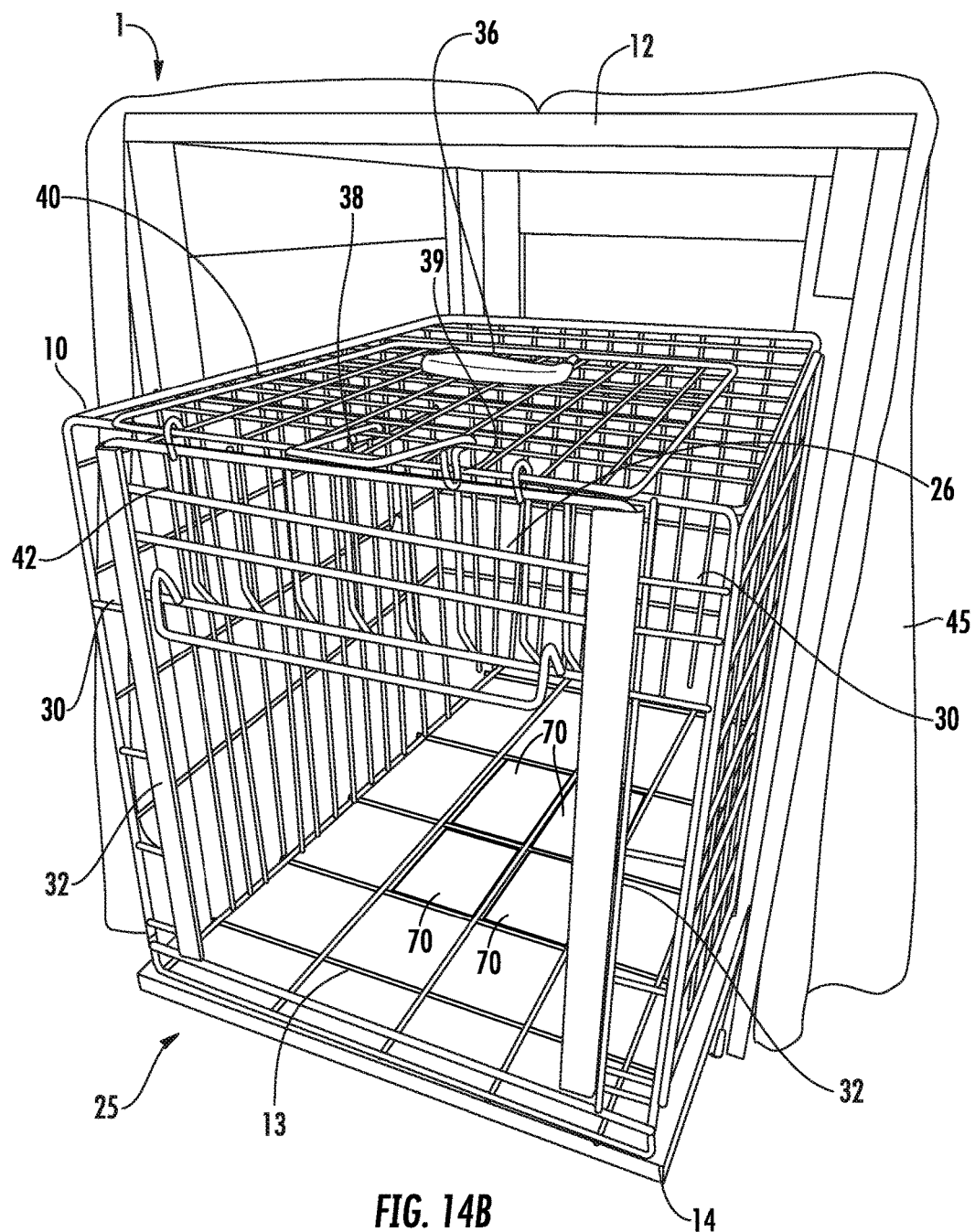
FIG. 14B is a view of the platform of FIG. 14A supporting an animal crate thereon.

FIGS. 14A and 14B illustrate a differently configured crate member in form of at least one, and preferably more than one, e.g., four as shown, upwardly extending projections 70. The projections 70 extend from an upper surface of the platform 14 and are configured to cooperate with and be received within openings defined by the crate bottom surface in the form of a wire grid as shown. As shown the projections 70 are generally rectangular, e.g. square, but any shape may be employed so to be received within the bottom crate surface. The height of the projections 70 is sufficient to cooperate with the crate bottom wall but not to interfere with the use of the crate 10 with a bottom tray and is conventionally used with a crate 10. Accordingly, the height of the projections may be between 1/16 inches to 3 inches in height, such as between ½ inch and 2 inches in height. For example, as long as the height of the projections is at least flush with the bottom surface of the crate 10, depending on the crate 10 thickness, the projection will provide a cooperating member for cooperating with the crate 10. As shown, the outer perimeter of the blocks 70 are similar in size to the respective individual square defined by the grid-like animal crate 10 and relatively small amount of slip is permitted between the crate 10 and the platform 14. The tolerances, therefore, are relatively small. Of course, any tolerances may be provided between the blocks 70 and the bottom surface of the crate grid and the amount of slip permitted may be increased. As such, the crate 10 may be manipulated to extend and retract the platform 14 without the crate 10 sliding substantially relative to the platform 14. Additionally, the crate 10 may be readily lifted from the platform 14 without requiring mechanical manipulation to remove the crate.

Figure 5:
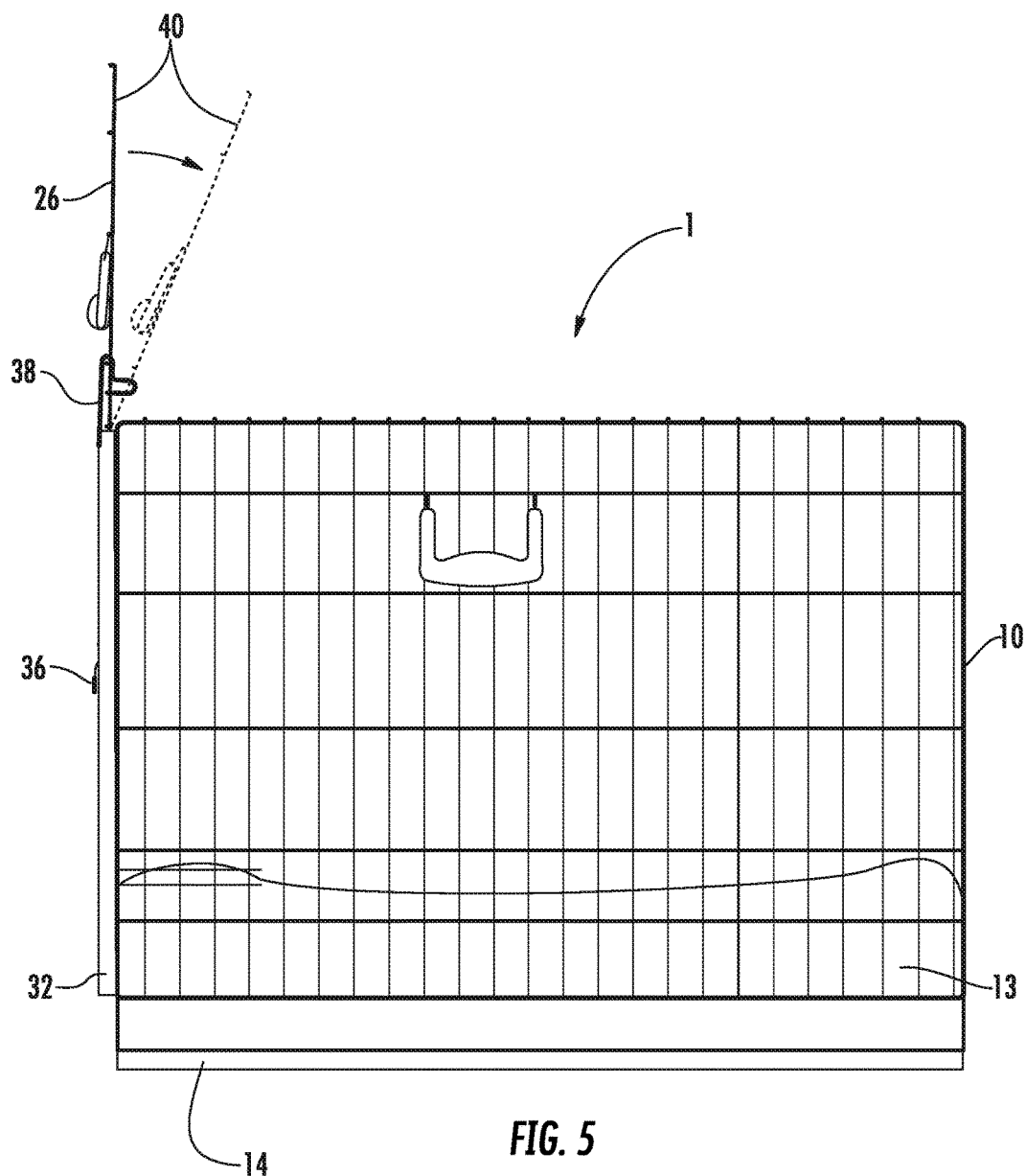
FIG. 5 is side elevation view of the animal crate, removed from the article of furniture with the crate door in an intermediate position and showing additional positions.
Figure 6:
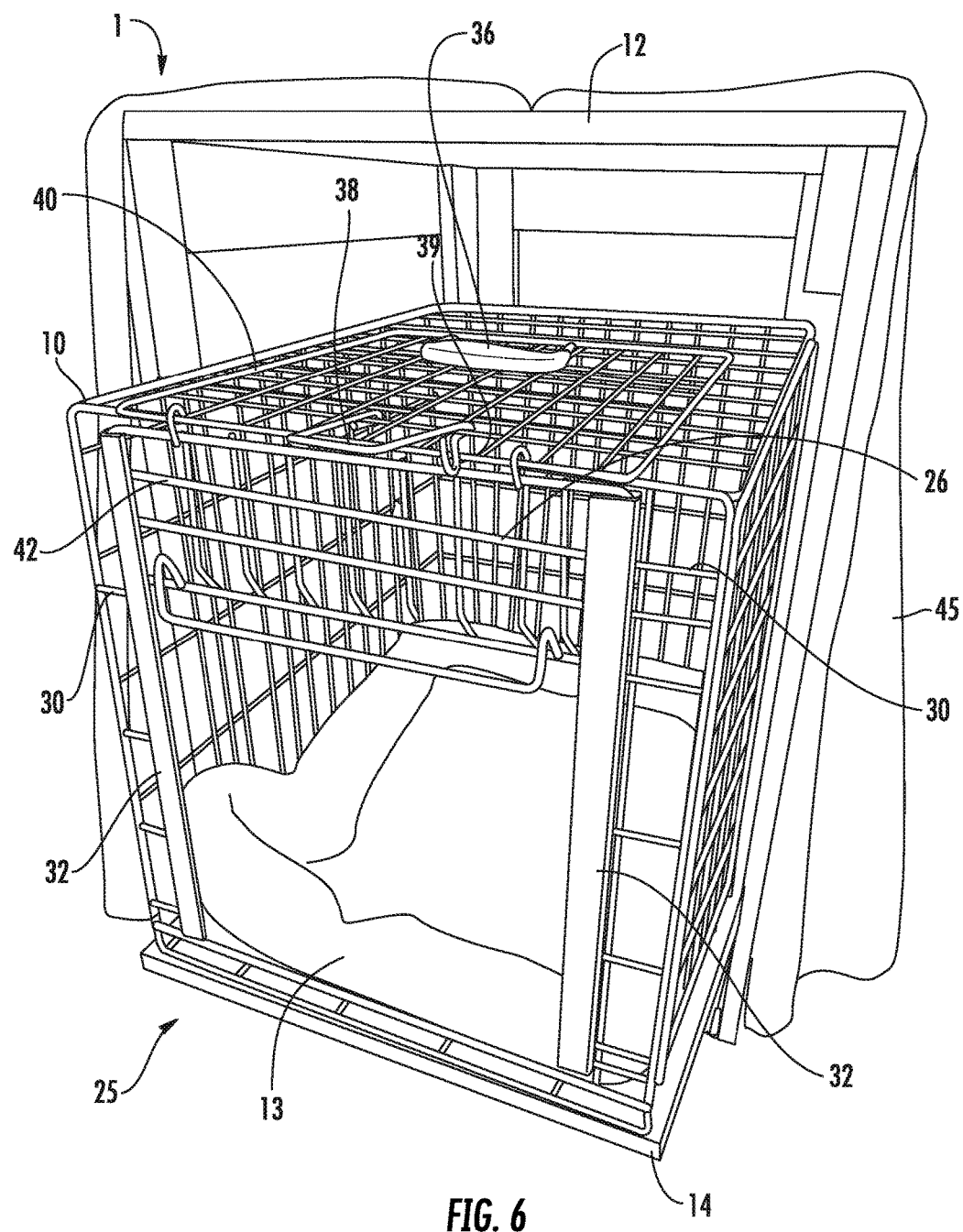
FIG. 6 a perspective view of the crate assembly in an extended position and having the door assembly opened to provide interior access to the crate.

The crate 10 includes a crate access wall 25, e.g., a fore wall, which includes a door assembly 26. One side of the crate, e.g., the fore wall, provides access to the crate interior. It is within the scope of the present invention for access to be provided on any side or the aft wall of the crate. According to the invention shown in FIGS. 1-6, the fore wall includes fore wall side panels 30 on outer sides thereof, and the door assembly 26 is positioned between the side panels. The door assembly includes at least one, and preferably two, vertical guides 32 which extend vertically along medial edges of each of the side panels 30. The door assembly further includes a medial door 34 positioned between the side panels. The medial door 34 is slideable within the side panel guides 32 and may be raised and lowered vertically to enable entrance into the crate as shown in FIG. 6.

Figure 4:
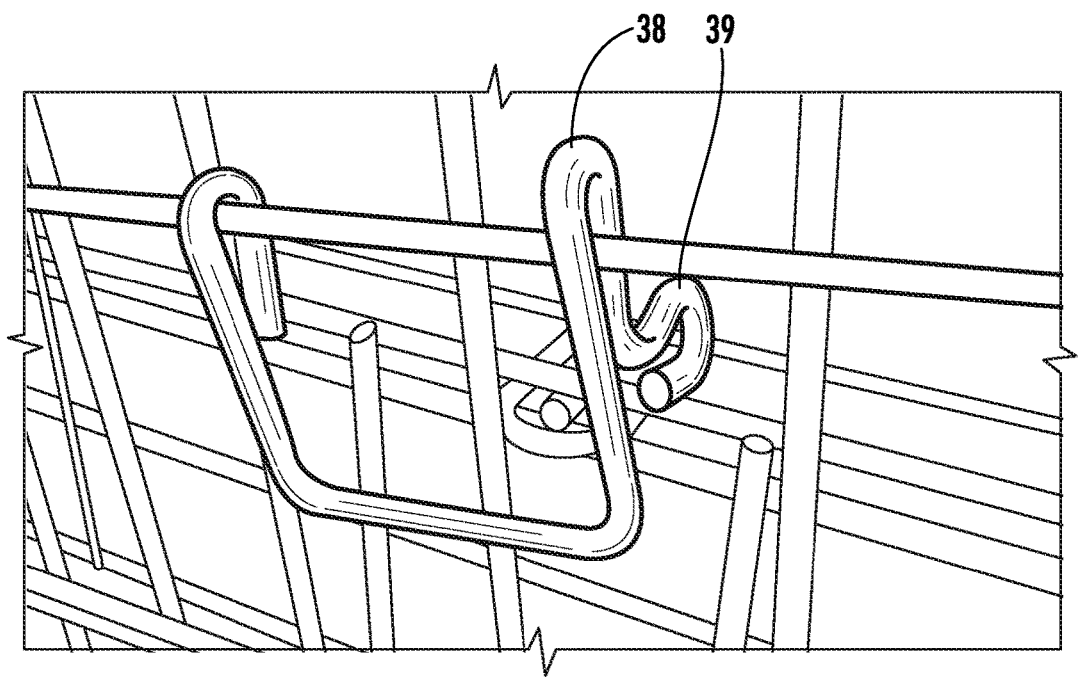
FIG. 4 is an enlarged, broken-away view of the stop for supporting the crate door in at least a partially opened position.

A handle 36 is provided on the outer surface of door to facilitate raising and lowering the door. As shown in FIG. 4, a stop 38 in the form of at least one inwardly extending hook or extension is provided on the door panel, for example, adjacent the bottom edge of the upper door panel, to cooperate with the door frame and prevent unintentional removal of the door panel. The stop 38 is pivotally mounted to a horizontal bar of the crate door assembly 26 as shown in the various Figures. FIG. 4 shows an enlarged view of the stop 38. As shown, the stop 38 remains non-engaged as the door assembly 26 is raised. As the door is raised to a predetermined height, at least one or more hook portions 39 may manually be engaged or be self-engaging with a horizontally extending crate member or bar to sustain the vertical height of the door assembly 26. This thereby secures the door assembly's position and prevent unintentional movement of the door assembly 26. Preferably, the stop 38 is positioned on the upper door panel 40. To disengage the stop 38, it may be manually raised to release the engagement of the hook 39. It may be desirable, depending upon the clearances employed, to require that the stop 38 remain manually engaged to facilitate all movement of the door.

The door 34 comprises at least one and preferably two door panels 40, 42. As shown, two panels are disclosed but it is within the scope of the present invention to provide more than two panels or a single panel. As shown, upper and lower panels 40, 42 are provided and are secured to one another with a securing member 44 to permit angular movement of one relative to the other, that is, the two panels may be bent relative to one another along the connection there between. Preferably the panels are hingedly connected and pivotal movement of the upper panel 40 is permitted in only one direction, that is, inwardly towards the aft end of the crate. As shown, the upper panel is at least twice as long (in height) as the lower panel and, preferably more than 3 or 4 times as long.

As shown in FIG. 1, the door assembly 26 is closed preventing ingress or egress into or from the crate 10. As such, the medial door 34 has been pulled down within the vertical guides 32. To lift the medial door 34, handle 36 may be pulled upon so as to raise the medial door 34 within the vertical guides 32 as shown in FIGS. 5 and 6. As shown in FIG. 5, once the connection between the upper 40 and lower 42 door panels raises to the top of the vertical guides 32, it will be urged in the aft direction until laying flush with the top of the crate 10 as shown in FIG. 6. This facilitates the platform 14 and crate 10 to be pushed in the aft direction beneath the table 12 while enabling ingress and egress of the animal.

Figure 10:
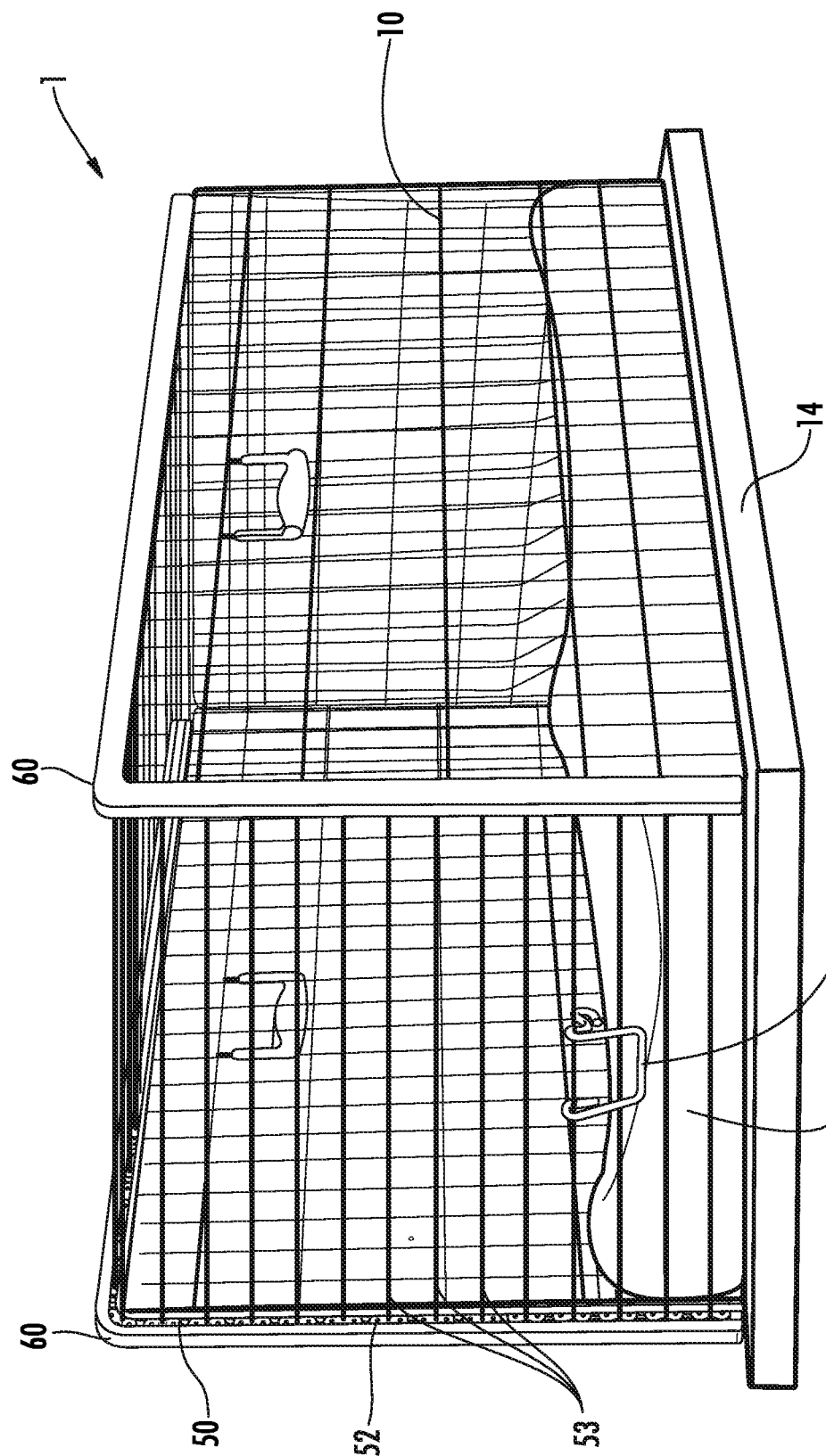
FIG. 10 is a perspective view of an animal crate according to another aspect of the present invention.
Figure 11:
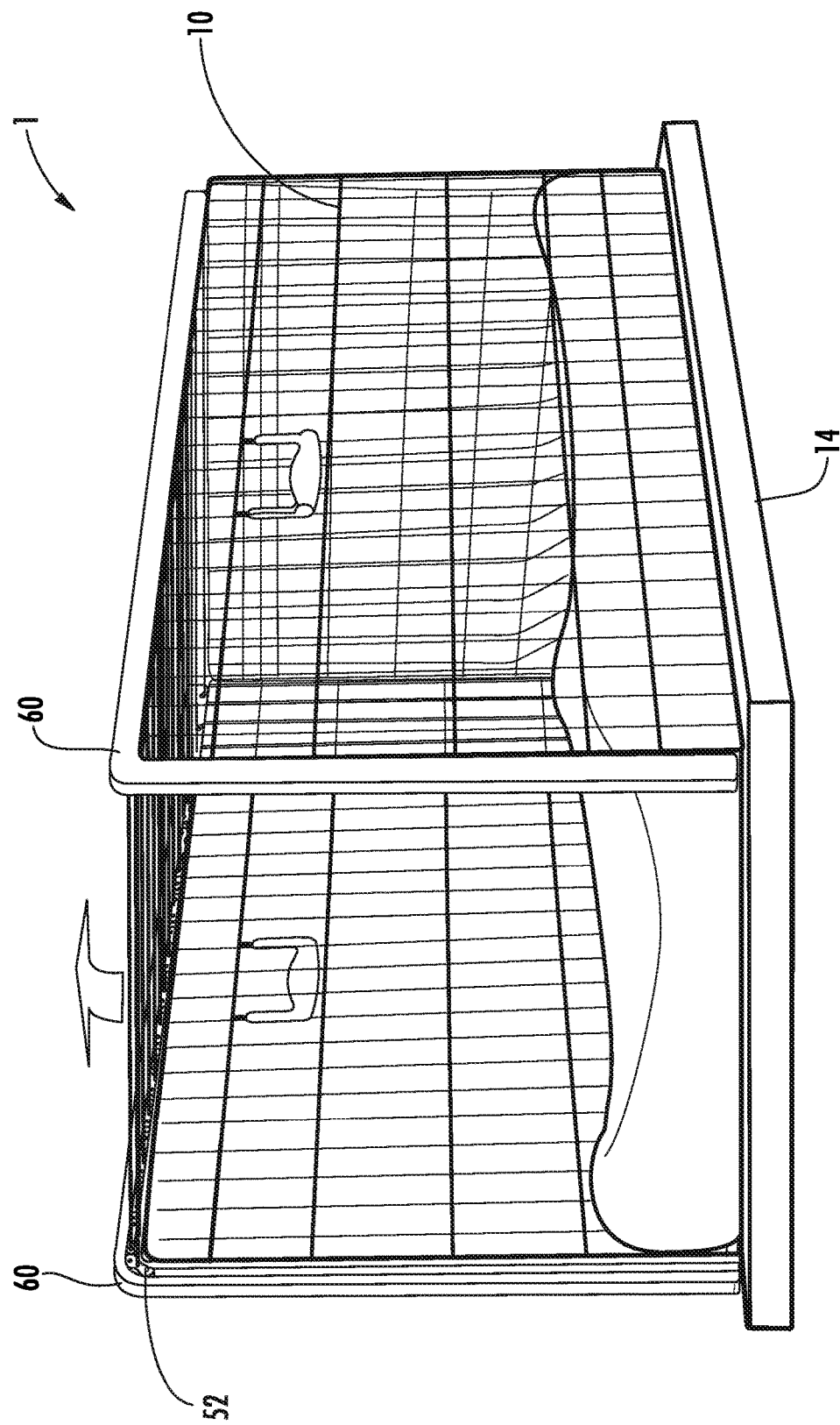
FIG. 11 is a perspective view of the animal crate of FIG. 10 with the door in a fully opened position.
Figure 12:
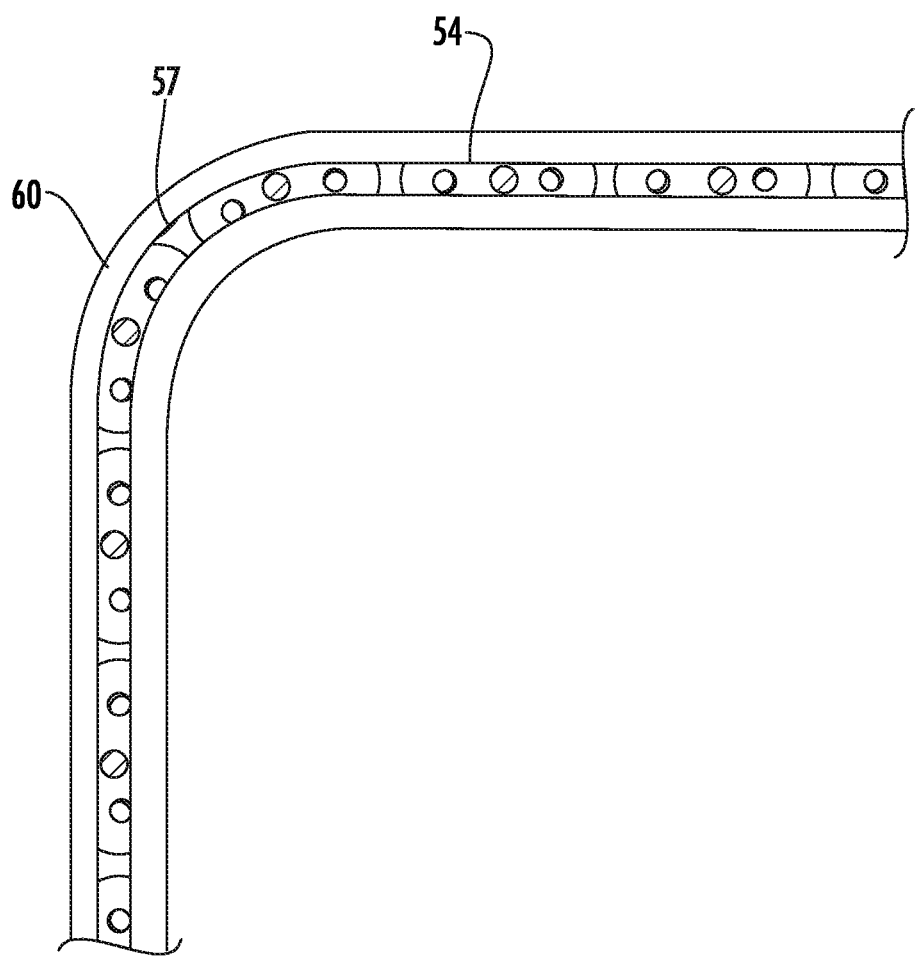
FIG. 12 is an enlarged view of crate door track and side member.

According to another aspect of the present invention, the door assembly 26 is differently configured as shown in FIGS. 10-13. The door assembly 26 includes an access wall or door 50 which enables ingress and egress for the animal. The door 50 includes vertically extending side members 52 in the form of a bush roller chain 52. A plurality of horizontal bars 53 extend between the side members 52. As shown in FIG. 12, the chain 52 consists of a series of short cylindrical rollers 56 held together by side links 54. Adjacent links are secured to one another by overlapping side links 57 as is known in the art. The horizontal bar members of the door 60 may be secured to the sides of the side links 54, such as soldered thereto or other securing means as known in the art. This provide a flexible side member 52 to facilitate a flexible door 50.

The side members 52 are positioned within and traverse the length of tracks 60 positioned along the front of the crate 10 as described above. The animal crate 10 further includes a pair of horizontally extending tracks which extend along the top surface of the animal crate 10. The vertical and horizontal tracks 60 are coextensive and continuous wherein the side member chains 52 may traverse the length of both tracks. The tracks 60 define a channel with an open surface facing inwardly. As such, the door 50 may be lifted while remaining flush with the crate 10 in its various positions. This obviates the need to fully extend the platform 14 from the table 12 to open the door of the animal crate 10. Rather, sufficient clearances are provided such that the door 50 may be opened while the crate remains beneath the table 12. FIG. 10 illustrates the door 50 in a partially opened position and FIG. 11 illustrates the door 50 in a fully opened position.

Figure 13A:
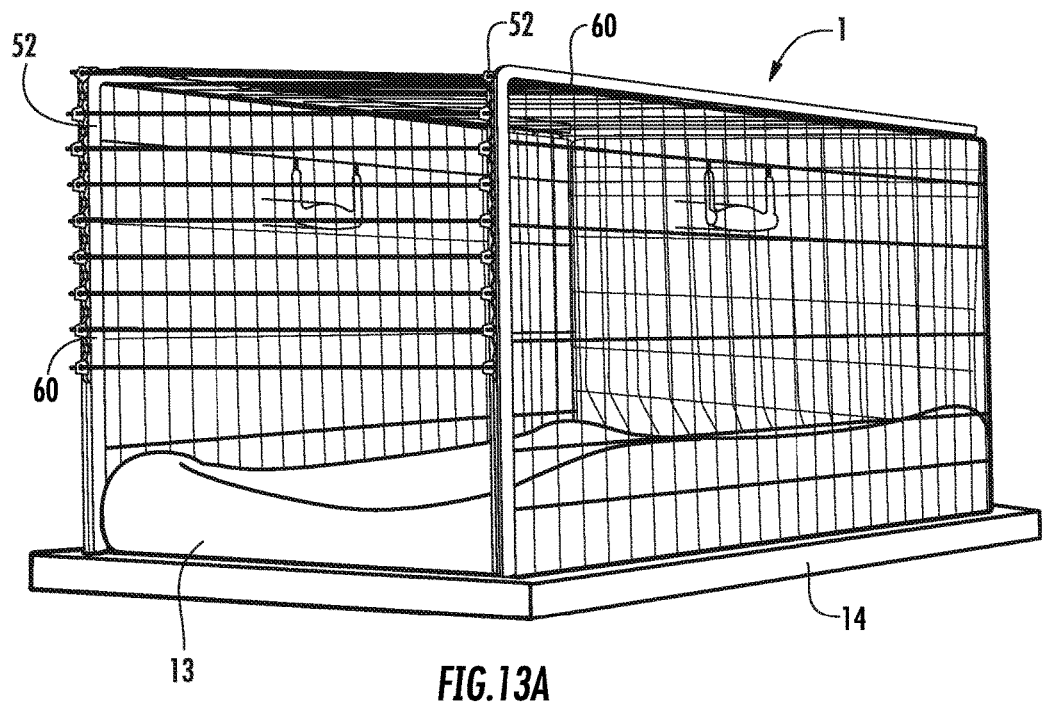
FIG. 13A is a perspective view of the animal crate with an outwardly facing track according to an aspect of the present invention.
Figure 13B:
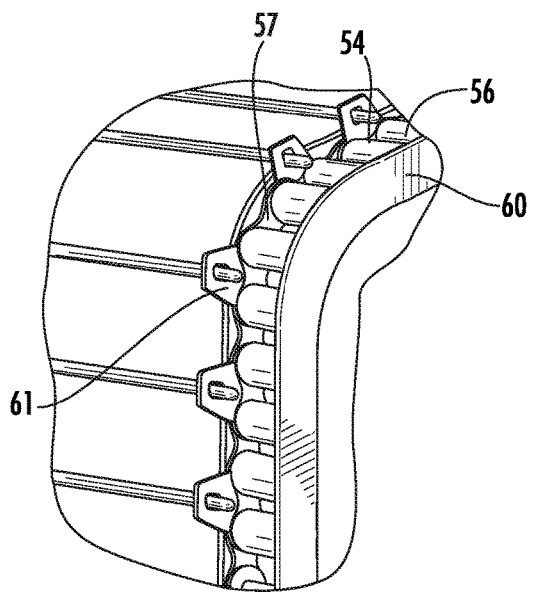
FIG. 13B is an enlarged view of the track and side member of the crate of FIG. 13A.

An alternative track 60 is provided in the assembly illustrated in FIGS. 13A and 13B. The tracks 60 define and outwardly facing channel and the side members 52 in the form of a bush roller chain extend along the length thereof. A securing member 61 extends from the bush roller chain 52 wherein the horizontal bars of the door 6 are secured thereto by a known fastener or soldered. As shown, the securing member 61 defines an aperture for receiving the horizontal bar of the door, but the door bars may also be soldered or otherwise connected to the chain 52.

The table includes a decorative outer member 45 having an access panels which are moveable from a first position exposing the crate to a second position enclosing the crate when the platform is in the retracted position. As shown, the outer member is formed of fabric and the access panels are located on its fore side (but which may be provided on any side of the table consistent with the crate door position) and includes a center opening defined by two side 46 panels and a medial panel 47. For conformity, preferably, this configuration is provided on all four sides. This configuration serves multiple purposes as described in more detail below. Although a flexible fabric outer member is shown, it is within the scope of the present invention, for example if mounted within fixed structures such as cabinetry, for only the front access panel to be flexible. Another aspect includes a non-flexible front access panel which may be selectively opened such as by opening sideways, upwardly, or downwardly (not shown). It is also with the scope of the present invention to provide a removable front access panel or no panel (such as if the entrance is on the aft side of the table). The table may also include leveling members in the form of threaded feet to adjust the height of the table and to balance the table.

While exemplary embodiments have been shown and described above for the purpose of disclosure, modifications to the disclosed embodiments may occur to those skilled in the art. The disclosure, therefore, is not limited to the above precise embodiments and that changes may be made without departing from its spirit and scope.

What is claimed is:

1. A securing assembly for an animal crate assembly housed within an architectural structure and for supporting an animal crate having a bottom and side surfaces, said securing assembly comprising:
    a platform configured for supporting the bottom surface of the animal crate and defining at least one crate mount and configured to cooperate with the bottom surface of the animal crate;
    at least one first, longitudinally extending mounting member configured for selectively connecting to the architectural structure and which defines an inwardly facing track; and at least one second mounting member connected to said platform adjacent a side edge thereof and configured to cooperate with said first mounting member, wherein said first mounting member wherein said track comprises a first wheel on a fore end of said track for cooperating with said second mounting member, said second mounting member is configured to cooperate with said track to permit relative movement of said platform along the length of said first mounting member and said second mounting member are matingly configured to permit said platform to move between a first retracted position and a second extended position wherein said platform is substantially extended in the fore direction from said first mounting member wherein said securing assembly is selectively connected to an architectural structure to house and to selectively conceal the animal crate.

2. A securing assembly according to claim 1 wherein said assembly includes a pair of said tracks and said second mounting member extends substantially along the length of opposing side edges of said platform to cooperate with said pair of tracks.

3. A securing assembly according to claim 1 further comprising a stop for preventing unintentional removal of said second mounting member from said first mounting member.

4. A securing assembly according to claim 3 where said stop is a second wheel positioned adjacent the aft end of said platform side edge for cooperating with said first wheel wherein said first and second wheel cooperate to facilitate insertion of said platform into said first mounting member.

5. A securing assembly according to claim 4 wherein said second wheel is positioned on said platform behind, in the aft direction, said second mounting member.

6. A securing assembly according to claim 1 wherein said mating member is a flange which extends outwardly from and along the side edge of said platform.

7. A securing assembly according to claim 1 wherein said crate mount is defined by an upper surface of said platform defines for removably receiving the bottom surface of said crate.

8. A securing assembly for an animal crate assembly housed within an architectural structure and for supporting an animal crate having a bottom and side surfaces, said securing assembly comprising:
   a platform configured for supporting the bottom surface of the animal crate and defining at least one crate mount defined by an upper surface of said platform for removably receiving the bottom surface of said crate and configured to cooperate with the bottom surface of the animal crate wherein said crate mount includes an aperture comprising a pair of opposing flanges and wherein said aperture is configured to receive at least a portion of said bottom and side surfaces of said crate and said crate bottom surface is supported by said flanges;
   at least one first, longitudinally extending mounting member configured for selectively connecting to the architectural structure and at least one second mounting member connected to said platform adjacent a side edge thereof and configured to cooperate with said first mounting member, wherein said first mounting member and said second mounting member are matingly configured to permit said platform to move between a first retracted position and a second extended position wherein said platform is substantially extended in the fore direction from said first mounting member wherein said securing assembly is selectively connected to an architectural structure to house and to selectively conceal the animal crate.

9. A securing assembly according to claim 8 wherein said pair of opposing flanges are opposing fore and aft flanges.

10. A securing assembly for an animal crate assembly housed within an architectural structure and for supporting an animal crate having a bottom and side surfaces, said securing assembly comprising:
   a platform configured for supporting the bottom surface of the animal crate and defining at least one crate mount defined by an upper surface of said platform for removably receiving the bottom surface of said crate and configured to cooperate with the bottom surface of the animal crate;
   wherein said crate mount comprises at least one projection extending upwardly from an upper surface of said animal crate platform wherein said at least one projection is configured to cooperate with the animal crate bottom surface to prevent substantial relative movement of the crate in a fore and aft direction relative to the platform;
   at least one first, longitudinally extending mounting member configured for selectively connecting to the architectural structure and at least one second mounting member connected to said platform adjacent a side edge thereof and configured to cooperate with said first mounting member, wherein said first mounting member and said second mounting member are matingly configured to permit said platform to move between a first retracted position and a second extended position wherein said platform is substantially extended in the fore direction from said first mounting member wherein said securing assembly is selectively connected to an architectural structure to house and to selectively conceal the animal crate.

11. A securing assembly according to claim 10 wherein said at least one projection is at least two projections.

12. A securing assembly according to claim 11 wherein said at least two projections are positioned on the platform adjacent one another.

* * * * *